US00RE40160E

(19) United States
(12) Reissued Patent
Callahan et al.

(10) Patent Number: US RE40,160 E
(45) Date of Reissued Patent: Mar. 25, 2008

(54) METHOD FOR CONTROLLING A QUANTITY OF MEDIUM TRANSFERABLE BETWEEN TWO ROLLERS

(75) Inventors: Martin John Callahan, Dover, NH (US); Wolfgang Schönberger, Schriesheim (DE)

(73) Assignee: Heidelberger Druckmaschinen AG, Heidelberg (DE)

(21) Appl. No.: 10/797,932

(22) Filed: Mar. 10, 2004

Related U.S. Patent Documents

Reissue of:
(64) Patent No.: 6,668,724
Issued: Dec. 30, 2003
Appl. No.: 10/237,542
Filed: Sep. 9, 2002

(30) Foreign Application Priority Data

Sep. 7, 2001 (DE) ..... 101 43 827

(51) Int. Cl.
*B41F 1/54* (2006.01)
*B41F 31/00* (2006.01)

(52) U.S. Cl. ..... 101/483; 101/148; 101/207; 101/351.1; 101/350.4; 101/352.13; 101/367; 101/DIG. 32

(58) Field of Classification Search ..... None
See application file for complete search history.

(56) References Cited

U.S. PATENT DOCUMENTS 2,986,088 A * 11/1961 Chase et al. ..... 101/350.5
3,285,169 A * 11/1966 Hartwig ..... 101/207
3,688,694 A * 9/1972 Preuss et al. ..... 101/350.1
3,956,986 A * 5/1976 Wirz et al. ..... 101/350.3
4,290,363 A * 9/1981 Köbler ..... 101/351.1
4,428,291 A * 1/1984 Dorow ..... 101/352.13
4,445,433 A 5/1984 Navi
4,479,432 A * 10/1984 Masaki et al. ..... 101/170
5,558,020 A * 9/1996 Marozzi et al. ..... 101/228
5,560,294 A * 10/1996 Anders et al. ..... 101/366
6,272,986 B1 * 8/2001 Hess ..... 101/137

FOREIGN PATENT DOCUMENTS

DE 44 31 464 A1 * 3/1996
DE 198 40 602 A1 * 3/2000
DE 198 40 603 A1 * 3/2000
DE 198 40 613 A1 * 3/2000
EP 0 983 849 A2 3/2000
EP 0 983 851 A2 3/2000
JP 63 222 853 A * 9/1988

* cited by examiner

*Primary Examiner*—Daniel J. Colilla
(74) *Attorney, Agent, or Firm*—Laurence A. Greenberg; Werner H. Stemer; Ralph E. Locher

(57) ABSTRACT

A method for controlling a quantity of medium transferable from a screen roller of a printing machine onto a roller that is in contact with the screen roller includes exerting an influence upon a difference in circumferential speed between the screen roller and the roller in contact therewith, and further includes controlling the difference in the circumferential speed as a function of the printing speed of the printing machine, so that printed medium density remains at least approximately constant at least within a wide printing speed range.

7 Claims, 2 Drawing Sheets

METHOD FOR CONTROLLING A QUANTITY OF MEDIUM TRANSFERABLE BETWEEN TWO ROLLERS

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to a method for controlling a quantity of medium transferable between two rollers, such as from a screen roller of a printing machine onto a roller in contact with the screen roller.

So-called short inking units, such as anilox inking units, for example, which are installed in printing machines, have become known heretofore from the published German Patent Document DE 198 40 613 A1. They comprise a screen roller, also known as an anilox roller, which is formed on the circumference thereof with depressions capable of being filled with ink or varnish. The screen roller has a chambered doctor blade assigned thereto which wipes or scrapes the ink or varnish off the screen roller. The screen roller co-operates with an ink applicator roller, onto which a constant quantity of ink/varnish is transferred due to the depressions. In the event of an increase in the printing and machine speed, respectively, a slight decrease in the ink density measured on a print carrier occurs because of the normally high-viscosity offset ink. This may result from the fact that the depressions are no longer filled correctly at higher printing speeds, because the depressions are no longer emptied so effectively upon contact with the ink applicator roller or because the transfer of ink from the screen roller onto the ink applicator roller and, via a plate cylinder, onto a blanket cylinder and from the latter onto the print carrier is impaired.

In order to have an effect upon the printed ink density, also called the optical density, in anilox inking units, it has become known heretofore to exert an influence upon the slip between the screen roller and the ink applicator roller. When the two rollers have the same circumferential speeds, i.e., there is no slip, an optimum transfer of ink from the screen roller onto the ink applicator roller takes place. When slip occurs between these rollers, the printed ink density decreases due to the diminishing ink quantity transferred from the screen roller onto the ink applicator roller.

It has become known from the hereinaforementioned published German Patent Document DE 198 40 613 A1 that it is unimportant whether the slip is positive or negative, and that only the absolute size thereof is critical. By an adjustment of the slip, therefore, the printed ink density can be changed relatively quickly.

SUMMARY OF THE INVENTION

It is accordingly an object of the invention to provide a method of the type mentioned in the introduction hereto, wherein, even at different printing speeds, a preferably uniformly good transfer of ink between the rollers is realizable.

With the foregoing and other objects in view, there is provided, in accordance with the invention, a method for controlling a quantity of medium transferable from a screen roller of a printing machine on a roller that is in contact with the screen roller, which comprises exerting an influence upon a difference in circumferential speed between the screen roller and the roller in contact therewith, and further comprises controlling the difference in the circumferential speed as a function of the printing speed of the printing machine, so that printed medium density remains at least approximately constant at least within a wide printing speed range.

In accordance with another mode, the medium controlled by the method is a medium selected from the group thereof consisting of ink and varnish.

In accordance with a further mode of the method, the difference in circumferential speed is zero at a standard printing speed.

In accordance with an alternative mode of the method, the difference in circumferential speed is zero at a printing speed higher than a standard printing speed.

In accordance with an added mode, the method further comprises determining, for the difference in the circumferential speed dependent upon the printing speed, a characteristic curve at which the printed medium density remains constant.

In accordance with an additional mode, the method further comprises storing the characteristic curve in a control device.

In accordance with yet another mode, the method further comprises controlling the difference in the circumferential speed as a function of a circumferential speed of a cylinder selected from the group thereof consisting of a printing-form cylinder and a blanket cylinder capable of being supplied with the medium by the screen roller.

In accordance with yet a further mode, the method further comprises increasing the temperature of the screen roller so as to raise the printed medium density.

In accordance with a concomitant mode, the method further comprises lowering the temperature of the screen roller so as to reduce the printed medium density.

Accordingly, the quantity of medium, which is capable of being transferred from a screen roller of a printing machine onto a roller, for example an ink applicator roller, which is in contact with the screen roller, is controlled by exerting influence on a difference in circumferential speed between the screen roller and the roller in contact therewith. The method is distinguished in that the difference in circumferential speed is controlled as a function of the printing/machine speed of the printing machine, so that the printed medium density remains constant or approximately constant at least within a wide printing speed range. This makes it possible to ensure that the transfer of medium from the screen roller onto the succeeding or following roller is uniformly good at virtually all printing speeds.

In connection with the invention of the instant application, by the "printed medium density" there is meant the density of a printed image transferred onto a print carrier. It is also known as optical density. Consequently, "printed medium density" does not refer to the material density of the printing medium.

The printing machine may be a sheet-fed or web-fed machine which is operated in wet offset or dry offset. The medium is preferably liquid, but may also be pasty, and is preferably an ink or a varnish.

In a preferred embodiment, provision is made for the circumferential speed difference to be zero at a standard printing speed and preferably at a printing speed higher than the standard printing speed. At the standard printing speed, therefore, the screen roller and the roller co-operating with the latter run synchronously. The standard printing speed is the speed at which the printing machine mainly operates. It may amount, for example, to 2.5 m/s in the case of a sheet-fed press and to 9 m/s in the case of a web press. In this mode of the method, it is assumed that, in the speed range lying above the standard printing speed, the printed medium density is no longer kept exactly constant. Here, however, instead, the printing unit can also operate most of the time without slip between the rollers. The wear of the rollers is correspondingly low here. A circumferential speed difference between the screen roller and the succeeding or following roller occurs here too, while the printing machine is being set up, i.e., during the commencement of the run-off of a printing order and while the printing machine is accelerated to the standard printing speed. This period of time is relatively short, when compared with the duration of the run-off of the entire printing order.

A method can also be realized readily wherein the circumferential speed difference is zero at the maximum printing/machine speed. In this case, although the printed medium density would be capable of being set at a constant level at all printing speeds lower than the maximum printing speed, most of the time there would nevertheless be slip between the screen roller and the succeeding or following roller, with the result that the useful life of the rollers is reduced.

Furthermore, a mode of the method is preferred, wherein a characteristic curve at which the printed medium density remains constant is determined for the circumferential speed difference dependent upon the printing speed. The characteristic curve may be determined, for example, by tests, in that the slip necessary between the screen roller and the succeeding or following roller so that the printed medium density remains constant is detected for various printing speeds. A continuous characteristic curve can be determined from these values by extrapolation and stipulates for each printing speed a new slip value (circumferential speed difference) and, for each slip value, the printing speed which is necessary for this purpose, respectively, at which the printed medium density is constant. In connection with the invention of the instant application, the term "characteristic curve" also refers to a function table which specifies discrete slip values for various printing speed ranges. One and the same slip value therefore applies to different printing speeds here, i.e., the printed medium density is not always exactly constant within this printing speed range, but these very slight density differences influence the print result to only a harmless extent.

In an advantageous mode, provision is made for storing the characteristic curve in a control device. Depending upon the print carrier, which may be formed, for example, of paper, cardboard, plastic material or metal, and upon the type of ink or varnish, the characteristic curve may be different. With the aid of the control device, the characteristic curve provided for the respective print carrier and the ink/varnish, respectively, is employed in order to adapt the slip (circumferential speed difference) between the screen roller and the succeeding or following roller to various printing speeds, in such a way that the printed ink density and the varnish density, respectively, is constant at any printing speed lower than the standard printing speed.

Other features which are considered as characteristic for the invention are set forth in the appended claims.

Although the invention is illustrated and described herein as embodied in a method for controlling a quantity of medium transferable between two rollers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
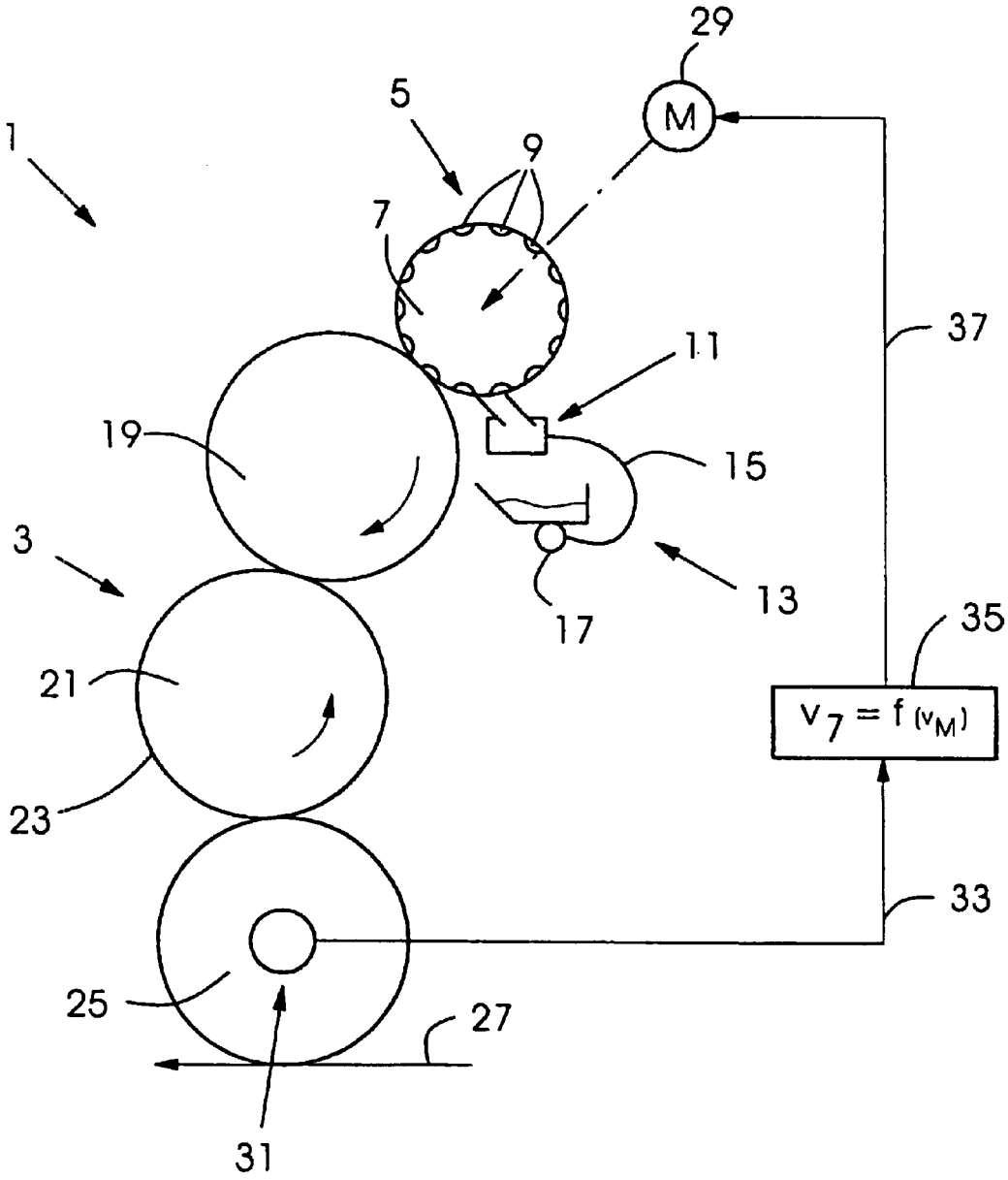
FIG. 1 is a side elevational diagrammatic and schematic view of an exemplary embodiment of a printing machine.

Referring now to the figures of the drawings and, first, particularly to FIG. 1 thereof, there is shown therein a diagrammatic and schematic view of an exemplary embodiment of a printing machine 1 comprising a printing unit 3 and an inking unit 5.

The inking unit 5 is formed here of a short inking unit, more precisely an anilox short inking unit, and comprises a screen roller 7, also known as an anilox roller, into the circumferential surface of which depressions 9 are introduced, for example cells or grooves, for receiving a liquid medium therein. It is assumed hereinafter, purely by way of example, that the medium is a liquid ink. The inking unit 5 has, furthermore, a chambered doctor blade 11, with the aid of which the ink is introduced into the depressions formed in the screen roller 7, and the circumferential surface of the screen roller is subsequently wiped or scraped off. The chambered doctor blade 11 is supplied with ink via a line 15 connected to a reservoir 13. The ink is pumped out of the reservoir 13 to the chambered doctor blade 11 with the aid of a pump 17.

The inking unit 5, furthermore, has a roller 19 which co-operates with the screen roller 7 and is formed, for example, as an ink transfer roller 19 with the rubber-elastic casing. The term "co-operate" has the meaning, here, that the screen roller 7 and the roller 19 are in contact with one another and form a roller nip.

A printing form 23, here formed by a plate cylinder 21, co-operates with the roller 19 and is itself in contact with a blanket cylinder 25. A printing image is applied by the latter to a print carrier 27, for example a sheet or web.

The roller 19, the plate cylinder 21 and the blanket cylinder 25 are connected to one another in a conventional manner via non-illustrated gearwheels of a drive transmission and are driven at the same circumferential speeds (circumferential speed difference/slip=0).

The roller 19 and the plate cylinder 21 are of the same diameter.

In the exemplary embodiment illustrated in FIG. 1, provision is made for the circumferential speed of the screen roller 7 to be capable of being set individually in relation to the roller 19, so that a slip of between 0% and 10% is realizable. As indicated in FIG. 1, this may take place with the aid of a specific motor drive 29 for the screen roller 7. Alternatively thereto, a variable-speed gear transmission may be provided, the drive of which takes place for the most part via a gearwheel connection to the roller 19 and wherein only the differential circumferential speed between the screen roller 5 and the roller 19 is additionally coupled by a comparatively small motor. A third alternative is to install an adjustable mechanical gear transmission. Further constructions for realizing a circumferential speed difference between the screen roller 7 and the roller 19 are possible.

In the exemplary embodiment illustrated in FIG. 1, therefore, the screen roller 7 is equipped with an individual drive. Furthermore, a speed transmitter 31 arranged on the blanket cylinder 25 is provided, which communicates the then-current printing/machine speed via a signal line 33 to a diagrammatically illustrated control device 35. Alternatively, the signal for the then-current printing/machine speed may also come directly from a non-illustrated main drive motor of the printing machine 1 and from the printing unit 3, respectively.

The control device 35 stores a characteristic curve, also known as a run-up curve, which stipulates the necessary circumferential speed difference between the screen roller 7 and the roller 19 as a function of the then-current printing speed ($V_M$) at which the printed/optical ink density remains constant. The appertaining slip of the screen roller 7 is therefore retrieved from the characteristic curve, and then the corrected speed ($V_7$) for the drive of the screen roller 7, i.e., the motor drive 29 connected to the control device 35 via a signal line 37, is stipulated or prescribed.

Figure 2:
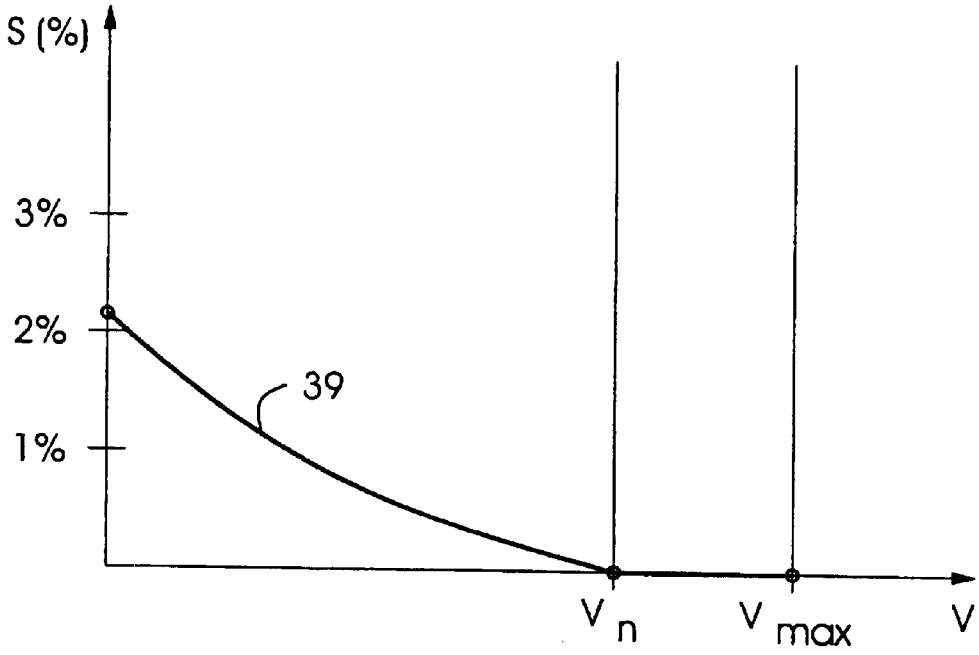
FIG. 2 is a plot diagram or graph, wherein printing/machine speed is plotted on the abscissa axis, and slip between a screen roller and a succeeding roller is plotted on the ordinate axis.

FIG. 2 is a plot diagram or graph, wherein, as a percentage, the printing/machine speed v is plotted on the abscissa axis and the slip s, i.e., the circumferential speed difference between the screen roller 7 and the succeeding or following roller 19 is plotted on the ordinate axis. In the graph, a curve 39 is depicted, which indicates, for each printing speed, the required circumferential speed difference between the screen roller 7 and the roller 19, so that the optical density of the ink to be transferred between the rollers 7 and 19, and of the printing image printed onto the print carrier, respectively, is preferably constant, but is at least approximately constant within the framework of a narrow tolerance.

It is apparent that the slip is relatively high at a low printing speed v, and decreases with a rising printing speed v, until it finally approaches zero and is zero, respectively, at a standard printing speed $v_n$. The standard printing speed is the speed at which the printing machine mainly operates. Even in the event of a further increase in the printing speed to the maximum printing speed $v_{max}$, the slip s remains unchanged at zero. When the circumferential speed difference between the screen roller 5 and the roller 19 is controlled along the characteristic curve 39, which may readily be performed with the aid of the control device 35, a constant optical ink density is realizable in the range between the minimum printing speed and the standard printing speed $v_n$.

Figure 3:
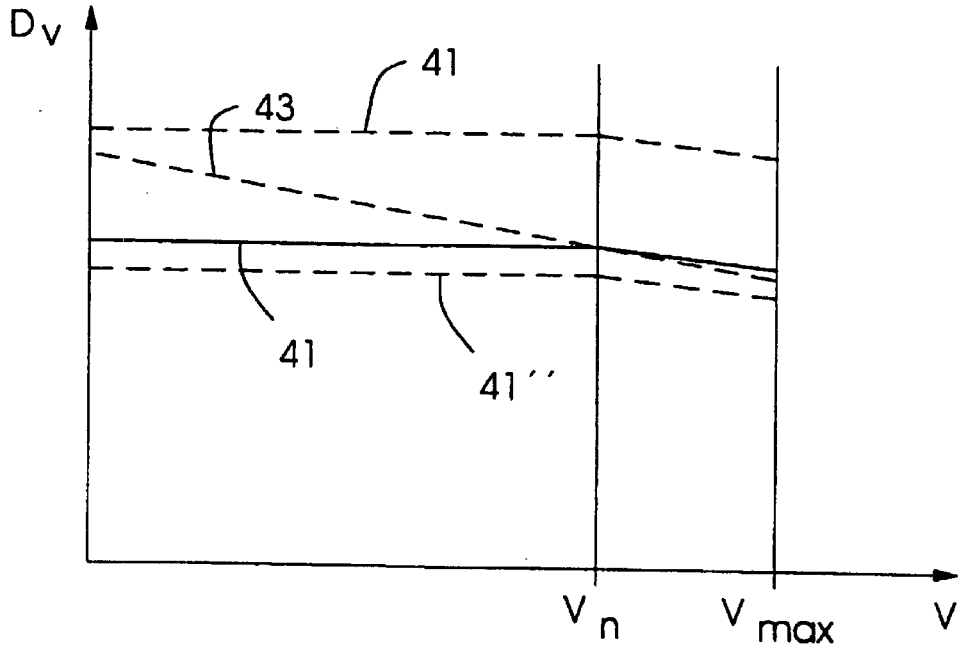
FIG. 3 is a plot diagram or graph, wherein printing/machine speed is plotted on the abscissa axis, and printed ink density is plotted on the ordinate axis.

FIG. 3 shows a graph wherein the printing/machine speed v is plotted on the abscissa axis, and the optical density $D_v$ of the ink to be transferred from the screen roller 7 onto the roller 19 is plotted on the ordinate axis. An unbroken line 41 represents the profile of the optical density, such as occurs when the slip between the rollers 7 and 19 is regulated or controlled in a way described with reference to FIG. 2. It becomes clear that the optical density is constant up to the standard printing speed $v_n$ and falls a little in the speed range lying thereabove, up to the maximum printing speed $v_{max}$. The reason for this is that the slip s remains zero even for printing speeds higher than the standard printing speed. The comparison, a broken line 43, represents the profile of the optical density against the printing speed v if slip regulation were not carried out, i.e., if the slip s were, for example, zero at every printing speed; the optical density $D_v$ decreases continuously with an increasing printing speed v.

As is apparent from FIG. 3, the ink density level achieved by the circumferential speed difference controller according to the invention is below that when slip regulation, such as is described with reference to FIG. 2, is not carried out. By an increase in the temperature of the screen roller 7, however, it is possible to raise the optical density continuously again, as indicated by the broken line 41'. Of course, it is also possible, by reducing the screen-roller temperature, to lower the optical density $D_v$ continuously, as indicated by the broken line 41".

All the varying modes of the method have in common the fact that the slip s, i.e., the circumferential speed difference between the screen roller 7 and the ink applicator roller 19, is stipulated or prescribed by the characteristic curve 39 for each printing speed v, so that he optical density $D_v$ is constant at all printing speeds v lower than the standard printing speed $v_n$. Insofar as the characteristic curve 39 is stored in the control device 35, action by the operating personnel in order to set the required circumferential speed difference, respectively, is preferably not required, at most, for manual fine setting.

We claim:

1. A method for controlling a quantity of medium transferable from a screen roller of a printing machine onto a roller that is in contact with the screen roller, which comprises*:* exerting an influence upon a difference in circumferential speed between the screen roller and the roller in contact therewith, and [further comprises] controlling the difference in the circumferential speed as a function of the printing speed of the printing machine, so that printed medium density remains at least approximately constant at least within a wide printing speed range*; and determining, for the difference in the circumferential speed dependent upon the printing speed, a characteristic curve at which the printed medium density remains constant, and storing the characteristic curve in a control device*.

2. The method according to claim 1, wherein the medium controlled thereby is a medium selected from the group [thereof] consisting of ink and varnish.

3. The method according to claim 1, wherein the difference in circumferential speed is zero at a standard printing speed.

4. The method according to claim 1, wherein the difference in circumferential speed is zero at a printing speed higher than a standard printing speed.

[5. The method according to claim 1, which further comprises determining, for the difference in the circumferential speed dependent upon the printing speed, a characteristic curve at which the printed medium density remains constant.]

[6. The method according to claim 3, which further comprises storing the characteristic curve in a control device.]

7. The method according to claim 1, which further comprises controlling the difference in the circumferential speed as a function of a circumferential speed of a cylinder selected from the group thereof consisting of a printing-form cylinder and a blanket cylinder capable of being supplied with the medium by the screen roller.

8. The method according to claim 1, which further comprises increasing the temperature of the screen roller so as to raise the printed medium density.

9. The method according to claim 1, which further comprises lowering the temperature of the screen roller so as to reduce the printed medium density.

* * * * *